US008723735B2

(12) United States Patent
Lee et al.

(10) Patent No.: US 8,723,735 B2
(45) Date of Patent: May 13, 2014

(54) MULTI-INPUT MULTI-OUTPUT ANTENNA WITH MULTI-BAND CHARACTERISTIC

(75) Inventors: Jae Ho Lee, Hwaseong-si (KR); Kook Hyun Kim, Seoul (KR); Kyung Sub Lee, Suwon-si (KR); Hyuk-Jin Kang, Seoul (KR)

(73) Assignee: Neopulse Co., Ltd. (KR)

( * ) Notice: Subject to any disclaimer, the term of this patent is extended or adjusted under 35 U.S.C. 154(b) by 256 days.

(21) Appl. No.: 13/295,874

(22) Filed: Nov. 14, 2011

(65) Prior Publication Data

US 2012/0319904 A1 Dec. 20, 2012

(30) Foreign Application Priority Data

Jun. 16, 2011 (KR) .................. 10-2011-0058657

(51) Int. Cl.
*H01Q 1/38* (2006.01)
(52) U.S. Cl.
USPC .................................. 343/700 MS; 343/893
(58) Field of Classification Search
USPC .......................................... 343/700 MS, 893
See application file for complete search history.

(56) References Cited

U.S. PATENT DOCUMENTS

2011/0298666 A1* 12/2011 Kim et al. .............. 343/700 MS

FOREIGN PATENT DOCUMENTS

WO WO 2010098529 A1 * 9/2010

* cited by examiner

*Primary Examiner* — Dieu H Duong
(74) *Attorney, Agent, or Firm* — John K. Park; Park Law Firm (57) ABSTRACT

The present invention relates to a multi-input multi-output (MIMO) antenna with a multi-band characteristic which includes a plurality of MIMO antenna, each having a pair of antenna elements, to support multiple bands, and is capable of guaranteeing high antenna efficiency for different bands by minimizing an interference between antenna elements of each MIMO antenna to improve an isolation characteristic. The MIMO antenna system having a multi-band characteristic, which includes two pairs of antenna patterns to support different band and coupling antenna parts separated from and coupled with the pairs of antenna patterns, can improve an isolation through the coupling antenna parts and guarantee an antenna gain. Moreover, since signal interference caused by the coupling effect can be cancelled to guarantee a band width with no change in antenna characteristics, it is possible to constructing two or more antennas to support a multi-band while guaranteeing stable operation of the antennas.

7 Claims, 8 Drawing Sheets

FIG.1

— Prior Art —

MULTI-INPUT MULTI-OUTPUT ANTENNA WITH MULTI-BAND CHARACTERISTIC

CROSS-REFERENCE TO RELATED APPLICATION

This application claims the benefit of Korean Application No. 10-2011-0058657, filed on Jun. 16, 2011, with the Korean Intellectual Property Office, the disclosure of which is incorporated herein by reference.

BACKGROUND OF THE INVENTION

1. Field of the Invention

The present invention relates to a multi-input multi-output (MIMO) antenna with a multi-band characteristic, and more particularly, to a multi-input multi-output antenna with a multi-band characteristic which includes a plurality of MIMO antenna, each having a pair of antenna elements, to support multiple bands, and is capable of guaranteeing high antenna efficiency for different bands by minimizing an interference between antenna elements of each MIMO antenna to improve an isolation characteristic.

2. Description of the Related Art

The current mobile communication technology is transitioning from the third generation (3G) into the fourth generation (4G) such as LTE (Long Term Evolution) or Wibro (or Mobile WiMAX) and a variety of communication systems for supporting a band used in 4G and guaranteeing mobility are coming on.

One of these communication systems is a multiple-input multiple-output (MIMO) system using a plurality of antennas. MIMO is a new and attractive approach to overcome problems of wireless communications, such as signal attenuation, interference increase, spectrum limitation and so on.

MIMO uses a plurality of antennas to provide diversity of the antennas, thereby consuming no additional wireless frequency while doubling a data processing speed and increasing a band range and reliability.

MIMO is an innovative multi-dimensional approach to transmit/receive two or more individual data streams through one wireless channel and allow a communications system to provide two times or more a data transfer rate per channel. By allowing the simultaneous transmission of data streams, MIMO can increase wireless data capacity several times without using any additional frequency spectrum.

The highest processing speed of the MIMO system can be increased by a multiple corresponding to the number of signal streams transmitted by a wireless channel. An MIMO signal is also called a "multi-dimensional signal" since a plurality of signals can be transmitted from different wireless apparatuses and antennas.

The MIMO system may also have the following demerits. First, the MIMO system requires a plurality of antenna elements. Accordingly, for example, a mobile terminal requires a plurality of antennas contained in a space relatively smaller than a base station. The use of the plurality of antennas may lead to a coupling effect between the antennas, which may result in signal distortion or cancellation and hence deterioration of signal reception sensitivity. Therefore, it is very important to remove such a coupling effect.

In order to reduce the coupling effect and prevent signals emitted from each antenna from having no effect on other antennas, an isolation has to be increased by separating the antennas by a predetermined distance so that a radiation pattern range occupied by one antenna element does not overlap with radiation pattern ranges occupied by other antenna elements. However, under current situations where mobile terminals are growing and growing smaller and accordingly MIMO elements are growing and growing smaller, it is nearly impossible to guarantee an isolation between antenna elements, which may result in overlap of radiation patterns of the antenna elements and hence signal attenuation and deterioration of signal reception sensitivity due to interference between signals emitted from the antenna elements.

Figure 1:
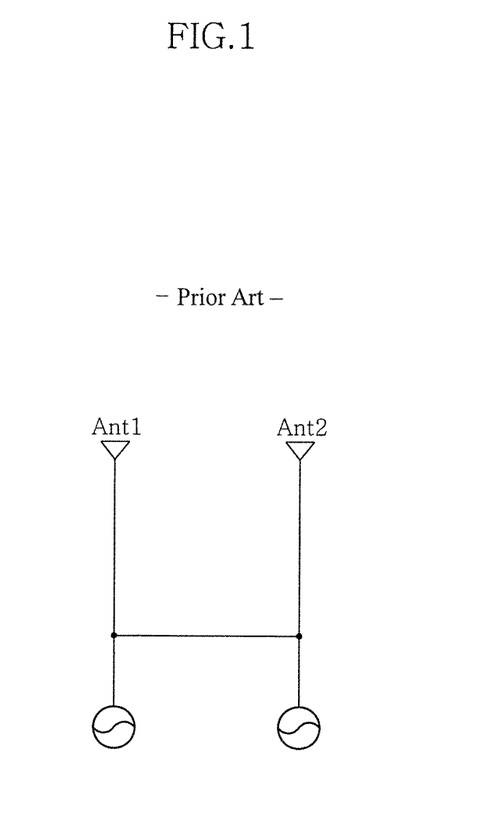
FIG. 1 is a view showing a conventional MIMO antenna.

In recent years, in order to overcome this problem, an approach of adding a circuit-short line for circuit-shorting between antenna elements having different power feeding points has been employed, as shown in FIG. 1. In this approach, since a signal induced from a firs antenna element into a second antenna element is in the reverse direction to a signal of the first antenna element, the signal of the first antenna element and the signal of the second antenna element are cancelled each other in the circuit-short line to thereby increase the isolation so that this approach can be applied to small-sized mobile terminals.

However, the above-mentioned approach has a demerit of change in an antenna element band characteristic to significantly reduce a band width.

In addition, 4G communication technologies have recently required MIMO antennas to support a plurality of bands. However, as described above, the current MIMO antenna implementation techniques are hard to meet requirements of high isolation and sufficient band width. Further, as the number of antenna elements required for implementation of the plurality of bands increases, the above space problem of mobile terminals may be more serious.

Accordingly, there is a need of an improved MIMO antenna implementation technique using a plurality of antenna elements to overcome the above-mentioned problems.

SUMMARY OF THE INVENTION

To overcome the above problems, it is an object of the present invention to provide a MIMO antenna system including a plurality of antenna patterns corresponding to different bands, which is capable of improving an isolation between the antenna patterns to minimize signal interference and prevent a loss of band width.

It is another object of the present invention to provide a MIMO antenna system which is capable of canceling signal interference between antenna patterns using a coupling effect between the antenna patterns, and improving antenna gains for bands corresponding to the antenna patterns.

To achieve the above objects, according to an aspect of the invention, there is provided a MIMO antenna system having a multi-band characteristic, including: a circuit board including two pairs of power feeders; a pair of carriers arranged in both sides of the circuit board; a first antenna pattern corresponding to a first band and a second antenna pattern corresponding to a second band, which are connected to the power feeders and are formed in one of the carriers; a third antenna pattern corresponding to the first band and a fourth antenna pattern corresponding to the second band, which are connected to the power feeders and are formed in the other carrier; and a first coupling antenna part which is formed in the one carrier and operates with the first band and a second coupling antenna part which is formed on the other carrier and operates with the second band, the first and second coupling antenna parts being separated from each other on the carriers on which the antenna patterns are formed.

Preferably, the system uses wireless communication of LTE or Wibro (or Mobile WiMAX) and is accommodated in an antenna box including connectors for supplying current into the power feeders.

Preferably, the first band has a resonance frequency two times or more as high as that of the second band and at least one of the first and second coupling antenna parts includes an extension which faces the other coupling antenna part and performs a stub function.

Preferably, at least one of the first and second coupling antenna parts includes a closed loop, each of the first to fourth antenna patterns has a length of $\lambda/4$, and each of the first and second antenna parts has a length of $\lambda/2$.

According to another aspect of the invention, there is provided a MIMO antenna system having a multi-band characteristic, including: a first carrier on which an antenna pattern corresponding to a first band and an antenna pattern corresponding to a second band are formed; a second carrier on which an antenna pattern corresponding to the first band and an antenna pattern corresponding to the second band are formed, the second carrier being separated from the first carrier; and a first coupling antenna part which is formed in the first carrier and operates with the first band and a second coupling antenna part which is formed on the second carrier and operates with the second band, the first and second coupling antenna parts being separated from each other on the first and second carriers.

Preferably, the first band is two times or more as high as the second band.

Preferably, at least one of the first and second coupling antenna parts includes an extension which faces the other coupling antenna part and performs a stub function.

Preferably, at least one of the first and second coupling antenna parts includes a closed loop.

According to the present invention, the MIMO antenna system having a multi-band characteristic, which includes two pairs of antenna patterns to support different band and coupling antenna parts separated from and coupled with the pairs of antenna patterns, can improve an isolation through the coupling antenna parts and guarantee an antenna gain. In addition, since signal interference caused by the coupling effect can be cancelled to guarantee a band width with no change in antenna characteristics, it is possible to constructing two or more antennas to support a multi-band while guaranteeing stable operation of the antennas.

In addition, when the MIMO antenna system is constituted by a plurality of MIMO antennas corresponding to different bands, coupling antennas with a simplified structure and improved antenna performance can be provided which can effectively cancel currents induced between separated antenna patterns through a coupling effect to thereby improve an isolation between the antenna patterns while increasing an antenna gain for a specific band.

Moreover, the present invention can provide a variety of coupling antenna structures to maximize a coupling effect to further improve an isolation between antenna patterns and coupling antennas and further increase an antenna gain.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Existing MIMO antenna systems may consider improvement of an isolation between two antenna patterns and minimize a change in band characteristics due to the improvement of the isolation to guarantee a constant band width for a specific band.

However, a wireless communication system using different bands such as LTE or Wibro (or Mobile WiMAX) requires a plurality of MIMO antennas corresponding to the different bands. Therefore, in this system, more antenna patterns than the existing MIMO antenna system including two antenna patterns have to be arranged in a limited space.

In particular, LTE determined as the next 4G mobile communication network encompasses both of a band of 700 to 800 MHz and a band of 2 to 3 GHz and accordingly has to form an MIMO antenna system supporting at least two pairs of different bands in a limited space in order to accommodate these bands.

Accordingly, the present invention supposes an MIMO antenna system having a multi-band characteristic which guarantees an isolation between two pairs of different antenna patterns supporting different bands to improve an antenna gain and guarantees a band width as much as possible.

The above-mentioned MIMO antenna system having a multi-band characteristic according to an embodiment of the present invention will be described in more detail with reference to the drawings.

Embodiments shown in the drawings are examples of an MIMO antenna system but may be applied to smart antenna systems having similar structures and other antenna systems to increase an isolation between adjacent antennas.

The following embodiments will be illustrated with an MIMO antenna system applied to a car without being limited thereto.

Figure 2:
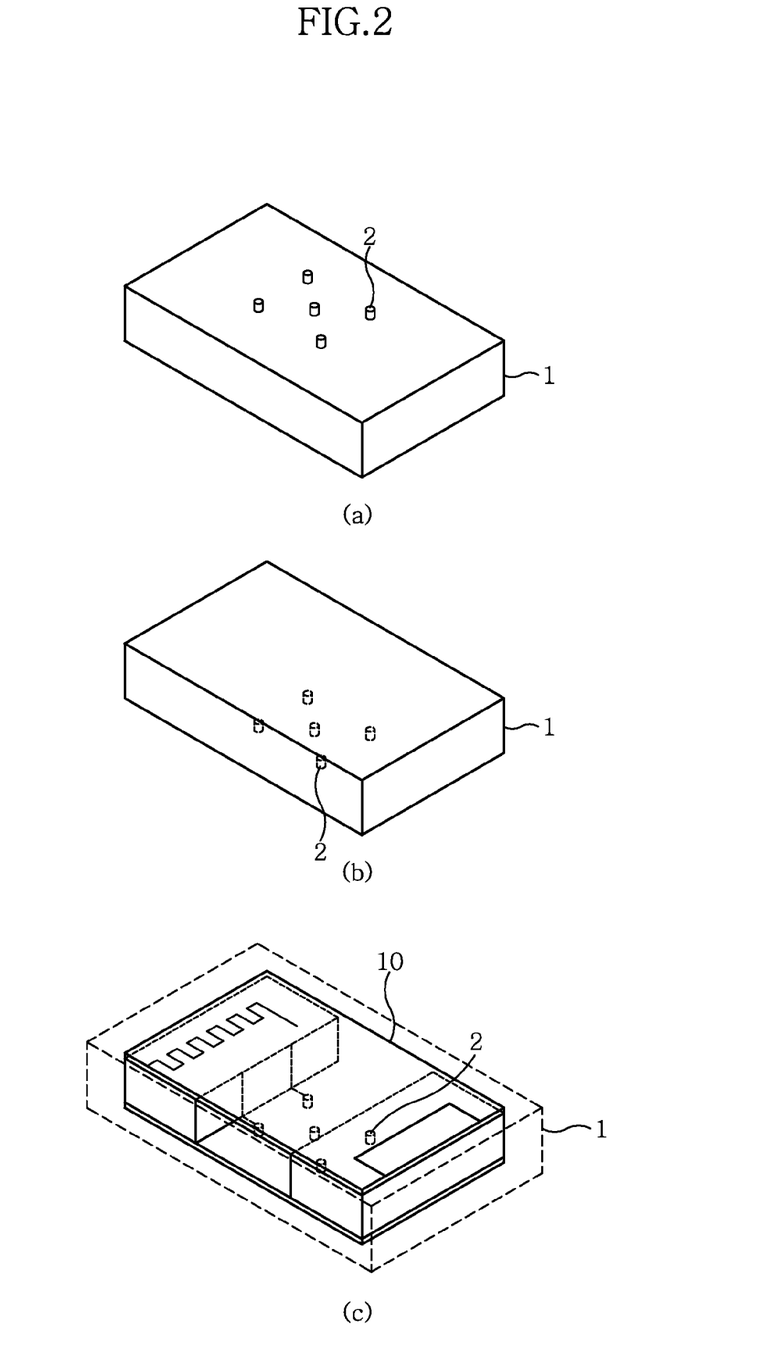
FIG. 2 is a view showing an MIMO antenna having a multi-band characteristic which may be applied to a car, according to an embodiment of the present invention.

FIG. 2 is a perspective view showing an MIMO antenna having a multi-band characteristic which may be installed in a car, according to an embodiment of the present invention. First, as shown in FIGS. 2(a) and 2(b), an MIMO antenna system to be installed in a car is accommodated in an antenna box 1 installed in the car. The antenna box 1 may include a plurality of connectors 2 for receiving current from the car.

Accordingly, as shown in FIG. 2(c), the MIMO antenna system 10 having the multi-band characteristic may include a circuit board which is accommodated in the antenna box 1 and has power feeders connected to the connectors 2, a pair of carriers arranged on the circuit board, two pairs of antenna patterns corresponding to different bands which are arranged on the carriers, an insulating layer formed on the antenna patterns, as a gap using a dielectric or air for electrical insulation, and coupling antenna parts formed on the insulating layer for coupling with the corresponding antenna patterns.

Now, details of the MIMO antenna system having the multi-band characteristic according to the embodiment of the present invention will be described based on the above-described configuration with reference to FIGS. 3 to 5.

Figure 3:
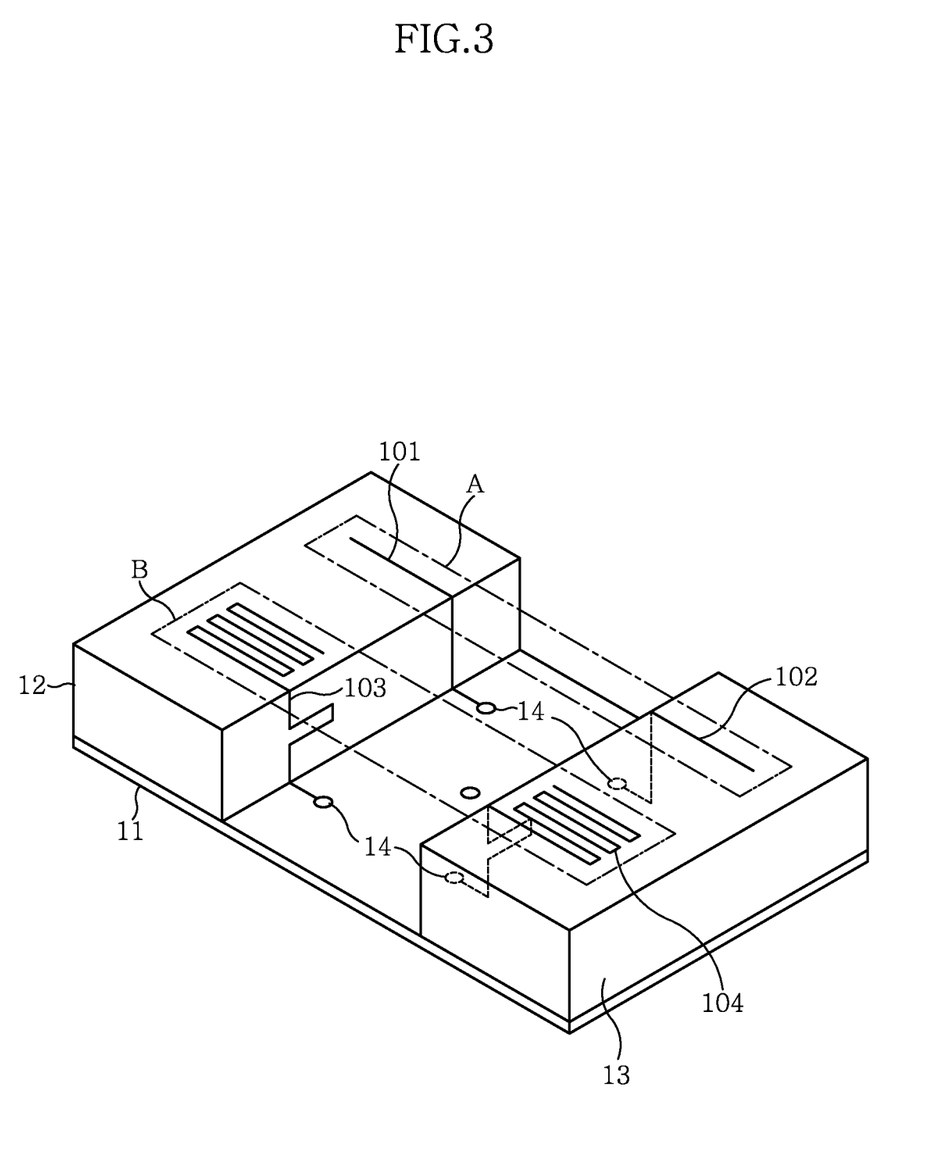
FIG. 3 is a view showing a configuration of an MIMO antenna having a multi-band characteristic according to an embodiment of the present invention.

First, FIG. 3 is a view showing an MIMO antenna system without the above-mentioned insulating layer and coupling antenna parts. As shown, the MIMO system may include a plurality of power feeders 14 connected to the connectors 2 on the circuit board 11, and the pair of carriers 12 and 13 arranged on the circuit board 11. In this example, the carriers 12 and 13 may be arranged in both side of the circuit board 11.

In addition, a plurality of antenna patterns 101, 102, 103 and 104 corresponding to different bands are formed on the carriers 12 and 13. One pair A (101, 102) of the plurality of antenna patterns has a resonance length corresponding to a first band and the other pair B (103, 104) has a resonance length corresponding to a second band. In this example, each of the antenna patterns is individually connected to one of the plurality of power feeder 14 formed on the circuit board 11 for independent irradiation and may has an antenna length of λ/4.

That is, a pair of antenna patterns corresponding to two different bands and formed on different carriers is provided.

Accordingly, the first and second antenna patterns 101 and 102 corresponding to the first band are individually formed on the respective carriers 12 and 13 and the third and fourth antenna patterns 103 and 104 corresponding to the second band are also individually formed on the respective carriers 12 and 13.

In the shown embodiment, the first and third antenna patterns 101 and 103 are formed in one carrier 12 and the second and fourth antenna patterns 102 and 104 are formed on the other carrier 13.

In addition, the antenna patterns of the first and second bands may be formed to face each other. For example, the first antenna pattern 101 and the second antenna pattern 102 may be formed to face each other and the third antenna pattern 103 and the fourth antenna pattern 104 may be formed to face each other.

A resonance frequency of the first band may be two times or more a resonance frequency of the second band, which makes it possible to obtain a certain isolation even if a coupling effect occurs between the antenna pattern of the first band and the antenna pattern of the second band formed on the same carrier.

In this example, the first band may be a band of 600 to 800 MHz and the second band may be a band of 2 to 3 GHz. In addition, the resonance frequency of the first band may be 700 MHz and the resonance frequency of the second band may be 2.7 GHz.

For example, an antenna system applied to LTE has to support both of low and high frequency bands. In this case, the above-configuration of the present invention can be applied to this antenna system since the resonance frequency of the low frequency band has two times or more a difference from the resonance frequency of the high frequency band.

In the meantime, the pair of antenna patterns A (101, 102) arranged on the different carriers 12 and 13 can guarantee the minimal isolation by a distance between the separated carriers 12 and 13 since it has a relatively high frequency band, while the pair of antenna patterns B (103, 104) provides a low isolation corresponding to the low frequency band, which may result in signal attenuation or distortion by a coupling effect due to mutual adjacent arrangement.

Of course, these patterns are insufficient to be used as two pairs of MIMO antennas due to an interference between antennas in each carrier 12 and 13, an inter-high frequency interference between antennas and an interference between antenna patterns. Accordingly, there is a need of a structure to guarantee an isolation between the antenna patterns and improve a band width.

Figure 4:
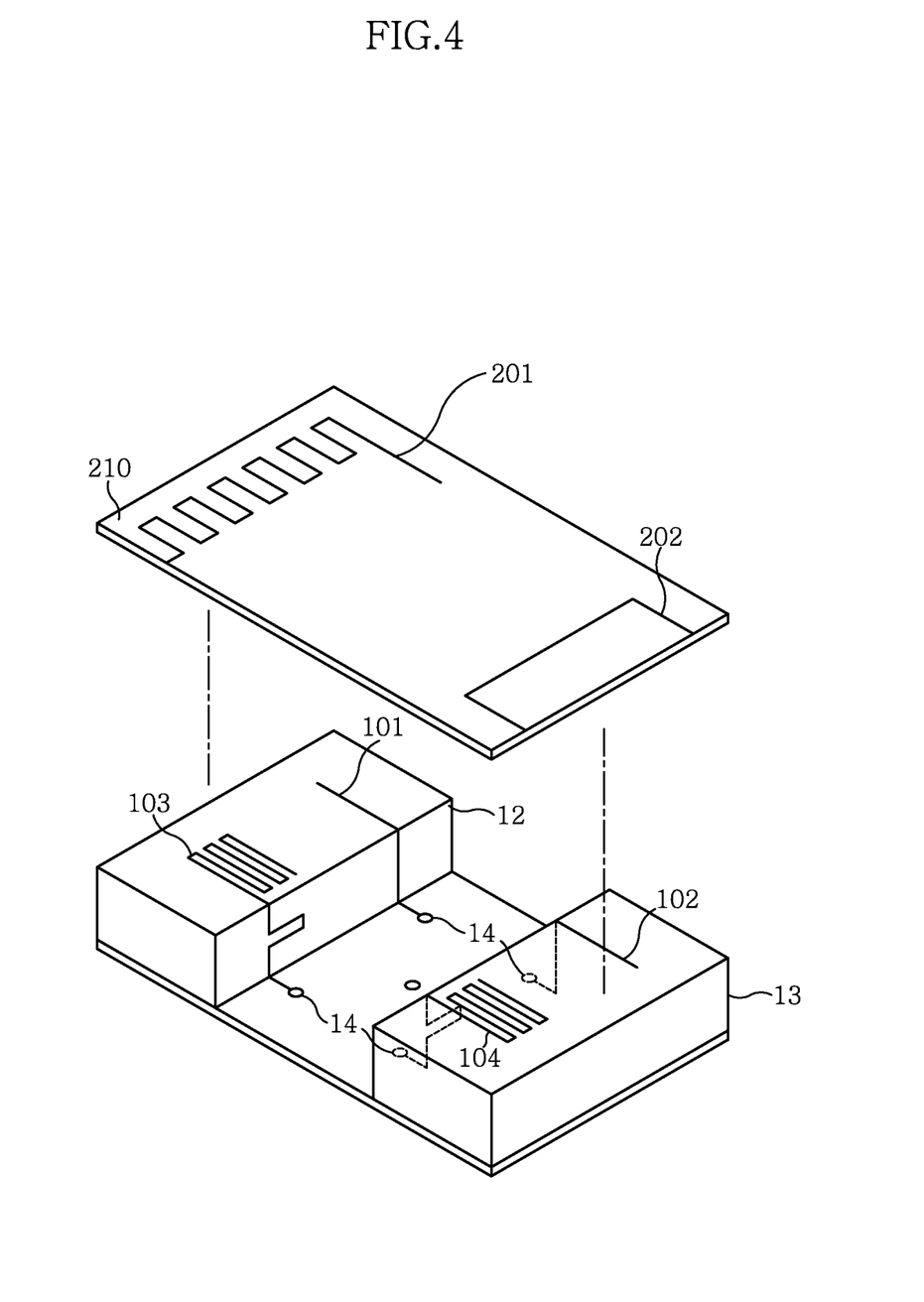
FIG. 4 is a view showing a configuration of a coupling antenna part in an MIMO antenna having a multi-band characteristic according to an embodiment of the present invention.
Figure 5:
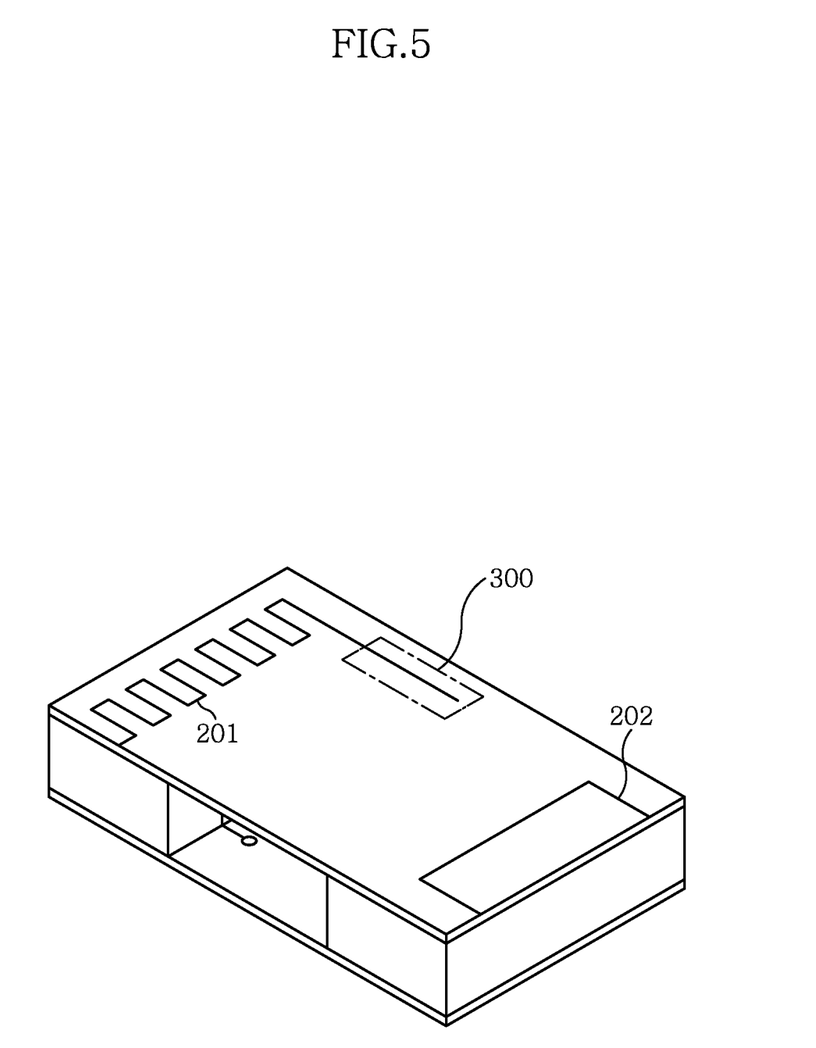
FIG. 5 is a view showing an MIMO antenna having a multi-band characteristic and incorporating a coupling antenna part according to an embodiment of the present invention.

This need can be met by a structure and operation principle of the MIMO antenna system having the multi-band characteristic according to an embodiment of the present invention, as shown in FIGS. 4 and 5.

First, as shown in FIG. 4, an insulating layer 210 is formed on the plurality of antenna patterns 101, 102, 103 and 104 formed on the carriers 12 and 13 and a first coupling antenna part 201 facing the first and third antenna patterns 101 and 103 and a second coupling antenna part 202 facing the second and fourth antenna patterns 102 and 104 are formed on the insulating layer 201.

With this configuration, as shown in FIG. 5, the first coupling antenna part 201 is separated from and coupled with the first and third antenna patterns 101 and 103 through the insulating layer 210 and the second coupling antenna part 202 is separated from and coupled with the second and fourth antenna patterns 102 and 104 through the insulating layer 210.

In this example, the first coupling antenna part 201 may have a resonance length corresponding to the second band by the above coupling structure and the second coupling antenna part 201 may have a resonance length corresponding to the first band by the above coupling structure and vice versa.

In addition, since the first and second coupling antenna parts 201 and 202 radiate electromagnetic waves using a coupling effect, they preferably has an antenna length of λ/2.

Based on the above configuration, the first coupling antenna part 201 is coupled with both of the first and third antenna patterns 101 and 103 and the second coupling antenna part 202 is coupled with both of the second and fourth antenna patterns 102 and 104.

In other words, since each of the first and second coupling antenna parts 201 and 202 is a single electrical conductor, these antenna parts connect a first band antenna pattern (the first and third antenna patterns) and a second band antenna pattern (the second and fourth antenna patterns), thereby improving an isolation between the first band antenna pattern and the second band antenna pattern formed on a single carrier.

For example, current induced into the third antenna pattern 103 by the first antenna pattern 101 flows into the first coupling antenna part 201 through a coupling between the third antenna pattern 103 and the first coupling antenna part 201 and accordingly is cancelled with current induced into the first coupling antenna part 201 by the first antenna pattern 101. That is, since the currents induced into the third antenna pattern 103 and the first coupling antenna part 201 by the first antenna pattern 101 are cancelled each other, an isolation between the antenna patterns and the coupling antenna parts is guaranteed.

In addition, since the current in the third antenna pattern 103 is induced into the first coupling antenna part 201 through a coupling and each of the third antenna pattern 103 and the first coupling antenna part 201 acts as a single conductor corresponding to the same band, an antenna gain can be increased and a band width can be guaranteed with no change in antenna characteristics.

Accordingly, an isolation between the first coupling antenna part 201, the first antenna pattern 101 and the third antenna pattern 103 is guaranteed to allow independent radiation and guarantee a high antenna gain.

Like the above-described operation principle of the first coupling antenna part 201, current induced into the second antenna pattern 102 by the fourth antenna pattern 104 flows into the second coupling antenna part 202 through a coupling between the second antenna pattern 102 and the second coupling antenna part 202 and accordingly is cancelled with current induced into the second coupling antenna part 202 by the fourth antenna pattern 104, thereby guaranteeing an isolation.

Similarly, since the second coupling antenna part 202 operates with the same band as the second antenna pattern 102, an isolation between the second coupling antenna part 202, the second antenna pattern 102 and the fourth antenna pattern 104 and a band width are guaranteed to provide a high antenna gain.

Moreover, even when current is induced from an antenna pattern formed on one carrier into an antenna pattern formed on another carrier (for example, current is induced from the third antenna pattern 103 into the fourth antenna pattern 104), since the current is cancelled due to a coupling effect in the same carrier, as described above, it is possible to further improve an isolation between the antenna patterns and the coupling antenna parts located on different carriers.

As shown in FIG. 5, the first coupling antenna part 201 corresponding to the first band as the low frequency band may further include an extension 300 to allow a portion of the first coupling antenna part 201 to be adjacent to the second coupling antenna part 202. The extension 300 functions as a stub of the first coupling antenna part 201.

This can further improve an isolation between the antenna patterns and the coupling antenna parts.

Figure 6:
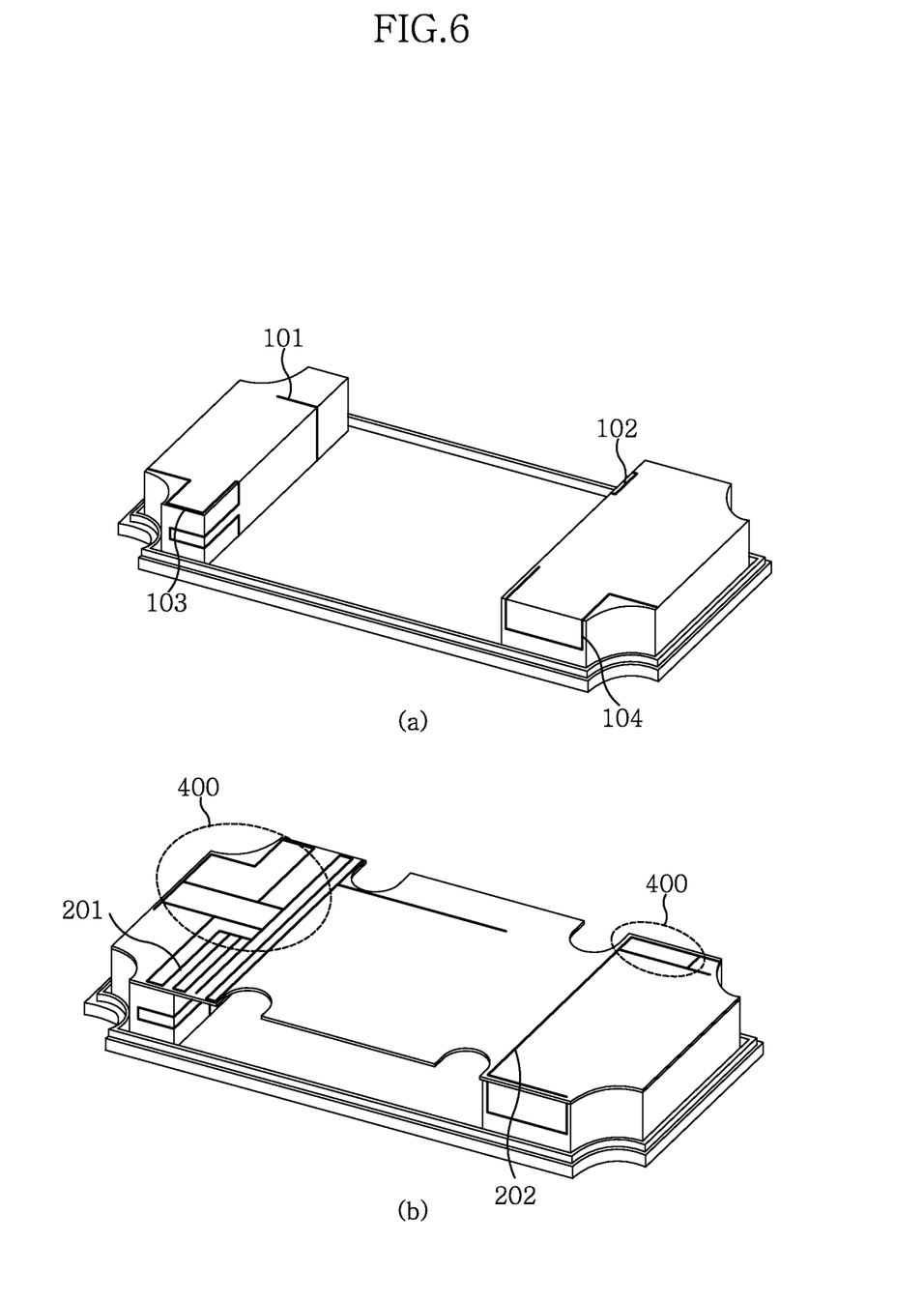
FIG. 6 is a view showing an antenna pattern and a structure of a coupling antenna part according to another embodiment of the present invention.

FIG. 6 is a view showing an MIMO antenna system having a multi-band characteristic according to another embodiment of the present invention. First, as shown in FIG. 6(*a*), the first antenna pattern 101 and the second antenna pattern 102 operating with the same band on different carriers may have different arrangement on the respective carriers. Similarly, the third antenna pattern 103 and the fourth antenna pattern 104 may operate with the same band and have different arrangement.

In addition, as shown in FIG. 6(*b*), at least one of the first coupling antenna part 201 and the second coupling antenna part 202 may be configured to have a closed loop 400 which provides an maximal coupling effect to further increase an antenna gain of each coupling antenna part.

Figure 7:
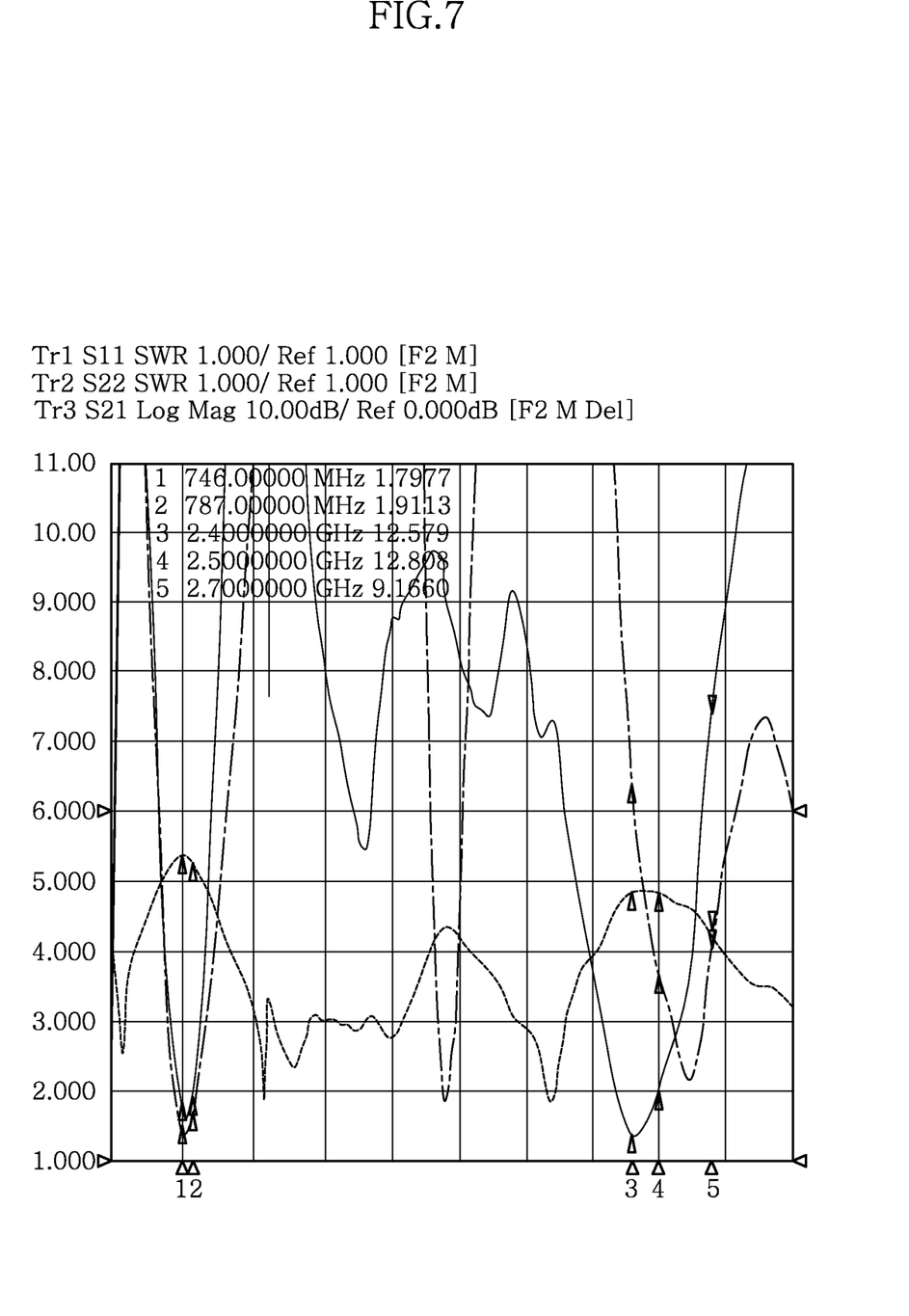
FIG. 7 is a graph showing a S-parameter characteristic for each antenna of an MIMO antenna system having a multi-band characteristic according to an embodiment of the present invention.

FIG. 7 is a graph showing a S-parameter characteristic for each antenna of an MIMO antenna system having a multi-band characteristic according to an embodiment of the present invention. This graph shows band characteristics by a portion S11 constituted by the first and third antenna patterns and the first coupling antenna part and a portion S22 constituted by the second and fourth antenna patterns and the second coupling antenna part.

First, it can be seen from the graph that the portion S11 has use bands in a low frequency band of 700 MHz and a high frequency band of 2.4 to 2.7 GHz. It can be also seen from the graph that a portion S21 showing an isolation has a high isolation in a use band since it has higher reflectivity in the use band than in other bands.

That is, it can be seen from the graph that the first and third antenna patterns radiate electromagnetic waves independently in different bands and particularly the third antenna pattern corresponding to the frequency band further increases the antenna gain through a coupling between the third antenna pattern and the first coupling antenna part.

In addition, like the portion S11, it can be seen from the portion S22 in the graph that the second and fourth antenna patterns radiate electromagnetic waves in the same band as the portion S11 and show a high isolation as well.

In particular, it can be seen from the portions S22 that the second antenna pattern and the second coupling antenna part operate with the same band and provide a high antenna gain for the high frequency band using a coupling.

As described above, the MIMO antenna system having the multi-band characteristic according to the embodiments of the present invention includes antenna patterns which have a high isolation, irradiate electromagnetic waves independently, and increase an antenna gain using a coupling.

Figure 8:
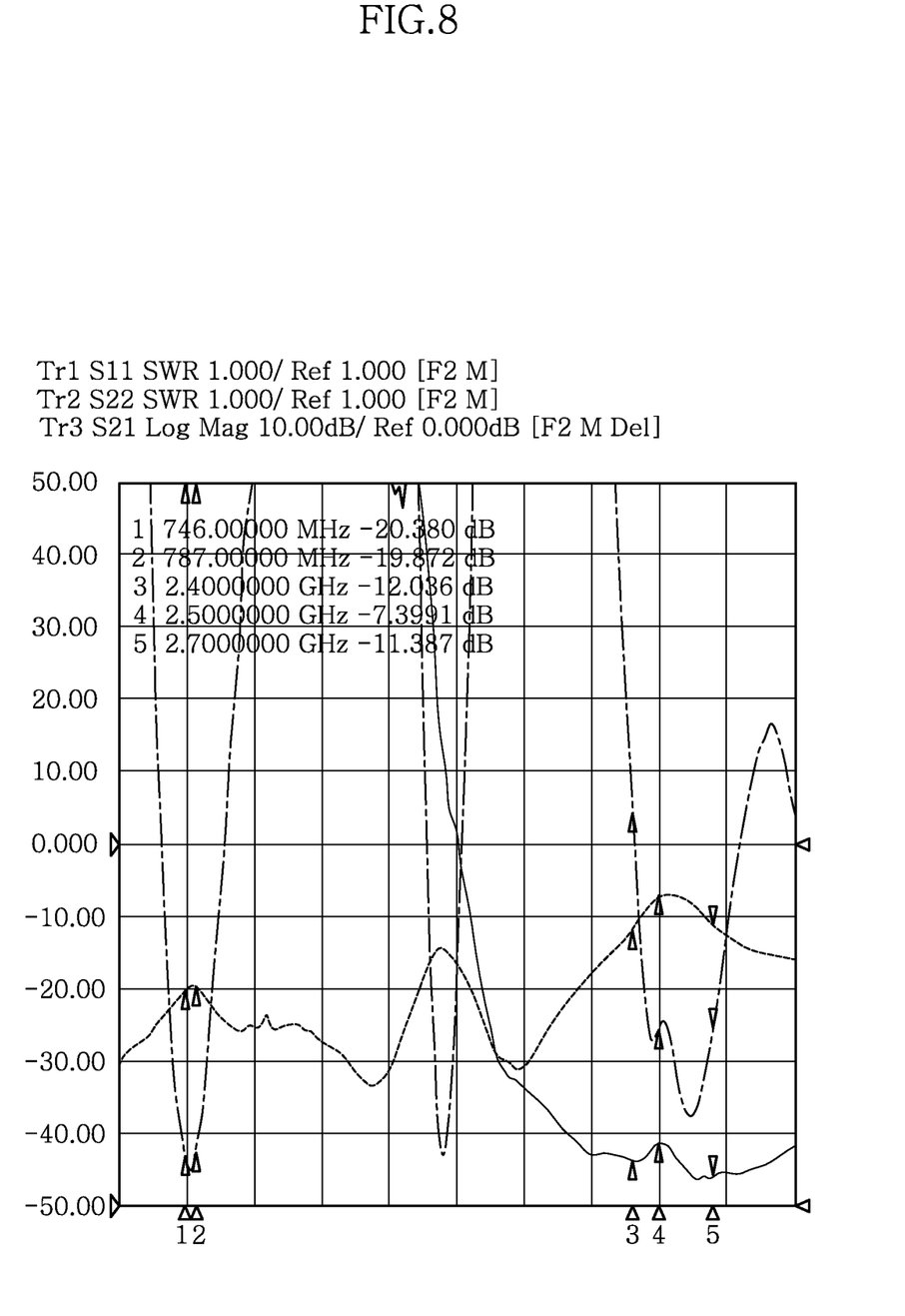
FIG. 8 is a graph showing a S-parameter characteristic of the entire antennas of an MIMO antenna system having a multi-band characteristic according to an embodiment of the present invention.

FIG. 8 is a graph showing a S-parameter characteristic of the entire antennas of an MIMO antenna system having a multi-band characteristic according to an embodiment of the present invention. It can be seen from the graph that the entire antennas have a high antenna gain of less than −10 dB in a low frequency band of 700 MHz. In addition, it can be seen from the graph that a portion S21 corresponding to an isolation shows a high isolation of more than −10 dB in the frequency band.

In addition, it can be seen that a high antenna gain and a high isolation are shown in the high frequency band of 2.4 to 2.7 GHz.

This means that there is little effect between the adjacent antenna patterns and coupling antenna parts.

In addition, it can be seen that a band width in each band is guaranteed to guarantee a high isolation and increase an antenna gain with no change in antenna band characteristics.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A MIMO antenna system having a multi-band characteristic, comprising:
   a circuit board including two pairs of power feeders;
   a pair of carriers arranged in both sides of the circuit board;
   a first antenna pattern corresponding to a first band and a second antenna pattern corresponding to a second band, which are connected to the power feeders and are formed in one of the carriers;
   a third antenna pattern corresponding to the first band and a fourth antenna pattern corresponding to the second band, which are connected to the power feeders and are formed in the other carrier; and
   a first coupling antenna part which is formed in the one carrier and operates with the first band and a second coupling antenna part which is formed on the other carrier and operates with the second band, the first and second coupling antenna parts being separated from each other on the carriers on which the antenna patterns are formed.

2. The MIMO antenna system according to claim 1, wherein the system uses wireless communication of LTE or Wibro (or Mobile WiMAX) and is accommodated in an antenna box including connectors for supplying current into the power feeders.

3. The MIMO antenna system according to claim 1, wherein the first band has a resonance frequency two times or more as high as that of the second band.

4. The MIMO antenna system according to claim 1, wherein at least one of the first and second coupling antenna parts includes an extension which faces the other coupling antenna part and performs a stub function.

5. The MIMO antenna system according to claim 1, wherein at least one of the first and second coupling antenna parts includes a closed loop.

6. The MIMO antenna system according to claim 1, wherein each of the first to fourth antenna patterns has a length of $\lambda/4$.

7. The MIMO antenna system according to claim 1, wherein each of the first and second antenna parts has a length of $\lambda/2$.

* * * * *